US012234679B2

(12) United States Patent
Vetter

(10) Patent No.: US 12,234,679 B2
(45) Date of Patent: Feb. 25, 2025

(54) DIRECT SWING LEAF ACTUATOR

(71) Applicant: DORMAKABA DEUTSCHLAND GMBH, Ennepetal (DE)

(72) Inventor: Matthias Vetter, Ennepetal (DE)

(73) Assignee: DORMAKABA DEUTSCHLAND GMBH, Ennepetal (DE)

( * ) Notice: Subject to any disclaimer, the term of this patent is extended or adjusted under 35 U.S.C. 154(b) by 0 days.

(21) Appl. No.: 17/998,711

(22) PCT Filed: Apr. 20, 2021

(86) PCT No.: PCT/EP2021/060205

§ 371 (c)(1),
(2) Date: Nov. 14, 2022

(87) PCT Pub. No.: WO2021/233624

PCT Pub. Date: Nov. 25, 2021

(65) Prior Publication Data

US 2023/0193681 A1 Jun. 22, 2023

(30) Foreign Application Priority Data

May 20, 2020 (DE) ..................... 10 2020 113 769.9

(51) Int. Cl.
*E05F 15/614* (2015.01)
*E05F 3/22* (2006.01)

(52) U.S. Cl.
CPC ............ *E05F 15/614* (2015.01); *E05F 3/225* (2013.01); *E05Y 2201/71* (2013.01);
(Continued)

(58) Field of Classification Search
CPC ....... E05F 15/614; E05F 15/611; E05F 11/00; E05F 3/225; E05Y 2600/314;
(Continued)

(56) References Cited

U.S. PATENT DOCUMENTS 4,045,914 A * 9/1977 Catlett .................. E05F 1/1207 49/334
4,599,824 A * 7/1986 Mitsuhashi ............. E05F 1/105 49/141
(Continued)

FOREIGN PATENT DOCUMENTS

DE 3923639 A1 1/1991
DE 10250994 A1 8/2003
(Continued)

OTHER PUBLICATIONS

International Search Report issued Jul. 2, 2021 re: Application No. PCT/EP2021/060205; pp. 1-2; citing: US 2012085035 A1, EP 2345788 A2 and EP 3467411 A1.

*Primary Examiner* — Daniel J Troy
*Assistant Examiner* — Susan M. Heschel
(74) *Attorney, Agent, or Firm* — CANTOR COLBURN LLP

(57) ABSTRACT

A direct swing leaf actuator for actuating a swing leaf of a door includes a receiving box for arrangement in or on a stationary part of the leaf system or of a building having the leaf system, and includes a driven shaft, which interacts with an actuator unit, wherein a swing leaf can be placed on the driven shaft in a torque-transmitting manner. A device is present for adjusting the spatial position of the driven shaft relative to the receiving box. The device has an adjusting frame with a height-adjusting unit, wherein the adjusting frame is arranged in the receiving box and the driven shaft is received on the adjusting frame so as to be height-adjustable using the height-adjusting unit.

14 Claims, 6 Drawing Sheets

(52) U.S. Cl.
CPC ..... *E05Y 2600/12* (2013.01); *E05Y 2600/314* (2013.01); *E05Y 2600/452* (2013.01); *E05Y 2900/132* (2013.01)

(58) Field of Classification Search
CPC ............. E05Y 2201/71; E05Y 2600/12; E05Y 2600/452; E05Y 2900/132
USPC .................................................... 49/334, 335
See application file for complete search history.

(56) References Cited

U.S. PATENT DOCUMENTS

| | | | | |
|---|---|---|---|---|
| 6,108,975 | A * | 8/2000 | Bailey | E05F 15/63<br>74/89.14 |
| 8,375,636 | B2 * | 2/2013 | Nixon | E05F 15/614<br>49/333 |
| 2012/0085035 | A1 | 4/2012 | Nixon | |
| 2013/0305854 | A1 * | 11/2013 | Wildforster | E05F 15/614<br>29/428 |
| 2020/0173214 | A1 * | 6/2020 | Chin | E05F 3/104 |

FOREIGN PATENT DOCUMENTS

| | | | |
|---|---|---|---|
| EP | 2345788 | A2 | 7/2011 |
| EP | 2754827 | A2 | 7/2014 |
| EP | 3467411 | A1 | 4/2019 |
| TW | 201126052 | A | 8/2011 |

* cited by examiner

DIRECT SWING LEAF ACTUATOR

TECHNICAL FIELD

The disclosure relates to a direct swing leaf actuator, i.e. an actuator designed to be connected via its driven shaft directly, i.e. without an intermediate connection of a linkage, to a swivel axis of a swing leaf in a swiveling manner thereto. Such actuators are generally sunken in a floor or inserted into a ceiling or a lintel and are capable of opening and/or closing the connected swing leaf. Known examples of such an actuator are floor door actuators and floor door drives. Door leaves and window leaves are for example considered as swing leaves.

BACKGROUND

A disadvantage of such actuators is that they have to be aligned such that the rotational axis of their respective driven shaft must be virtually identical to the swivel axis of the swing leaf to be actuated and after assembling the swing leaf, it must securely enter into rotational engagement with the driven shaft of the actuator. The smallest deviations can mean that the driven shaft can tilt when the swing leaf is actuated with its drive element to be rotated. Additionally, unevenness of the floor can mean that the cement box receiving the floor leaf actuator is not mounted at the required depth and/or inclination in the floor. This can mean that the driven shaft is spaced apart from the swing leaf such that the actuator is incapable of swiveling the swing leaf. Floor door actuators are for example built into a cement box formed into the floor. The recess in the floor to receive the cement box must be made before the actuator and the swing leaf are assembled and namely precisely in each case. This requires very precise planning and design of the floor work to receive the cement box.

For example, DE 39 23 639 A1 discloses a direct swing leaf actuator, i.e. an actuator designed to be connected via its driven shaft directly, i.e. without an intermediate connection of a linkage, to a swivel axis of a swing leaf in a swiveling manner thereto. Such actuators are generally sunken in a floor or inserted into a ceiling and are capable of opening and/or closing the connected swing leaf. Disadvantageously, the entire actuator unit must be moved when the driven shaft is finely adjusted and it cannot be replaced, without disassembling the door leaf.

EP 2 754 827 A2 discloses a direct swing leaf actuator for actuating a swing leaf of a leaf system, comprising a receiving box for arrangement in or on a stationary part of the leaf system or of a building comprising the leaf system, and comprising a driven shaft, which interacts with an actuator unit, wherein a swing leaf can be placed on the driven shaft in a torque-transferring manner, and wherein a device is present for adjusting the spatial position of the driven shaft relative to the receiving box. After placing a swing leaf on the driven shaft, the bearing of the driven shaft can no longer be changed in the vertical position and in the planar side position, which can make the assembly and the fine adjustment of the direct swing leaf actuator complex.

SUMMARY

The present disclosure therefore makes it possible to simplify the assembly and fine adjustment of the swing leaf relative to the idle part, for example of a door system with a direct swing leaf actuator.

This is achieved by proceeding from a direct swing leaf actuator according to the preamble of the claims in conjunction with the characterizing features.

Advantageous further developments of the disclosure are indicated in the dependent claims.

The disclosure includes the technical teaching that a direct swing leaf actuator for actuating a swing leaf, i.e. for example of a swing leaf of a door system, has a receiving box for arrangement in or on a stationary part of the leaf system or of a building comprising the leaf system, for example the wall, the ceiling or in particular the floor. Furthermore, the direct swing leaf actuator has a driven shaft, which interacts with an actuator unit of the direct swing leaf actuator. The actuator unit corresponds in function to a classic direct swing leaf actuator, only without housing or receiving box. In this case, a swing leaf is designed so that it can be placed on the driven shaft in a torque-transmitting manner. Additionally, a device is present for adjusting the spatial position of the driven shaft relative to the receiving box.

According to the disclosure, this device has an adjusting frame with a height-adjusting unit, which is designed as a receiving module and is therefore separable. The adjusting frame is arranged separably in the receiving box and in particular individually next to or following an actuator unit, wherein the latter, as well as the receiving module, is also replaceable and for example forms only one closer with a spring force storage means or is designed as a complete motor-driven door actuator.

The driven shaft is received by means of the height-adjusting unit on the adjusting frame so as to be movable towards and away from the swing leaf along its rotational axis such that the driven shaft and therefore also the swing leaf can be height-adjusted, while the swing leaf is already assembled. This makes it possible to adjust the driven shaft after inserting the direct swing leaf actuator for example in a floor such that, in the case of the assembled swing leaf, it securely enters into rotational engagement therewith, which simplifies the assembly. Additionally, the assembly of the swing leaf actuator according to the disclosure can take place less precisely than in the state of the art since the adjusting frame according to the disclosure can itself be adjusted and therefore finely adjusted even with a swing leaf assembled on the driven shaft.

Moreover, the arrangement without actuator unit can be pre-assembled. Irrespective of this, a very small rear axle dimension of preferably 38 mm to 48 mm can be implemented, which simplifies the assembly further.

The actuator unit is preferably arranged substantially or completely outside of the adjusting frame and structurally separated or structurally separable therefrom. Therefore, the adjusting frame and the actuator unit form separate modules and can thus be assembled in the receiving box independently of one another. This allows a conventional direct swing leaf actuator to also be used as the actuator unit and the drive can be replaced in the case of an already assembled swing leaf. Thus, for example a spring force storage means can even subsequently be replaced with a motor-driven swivel drive.

Alternatively or additionally, a gear wheel or a chain wheel can be arranged on the driven shaft which interacts with the actuator unit. That is to say that the actuator unit, which generates the force to swivel the swing leaf, can be arranged spatially separated from the driven shaft. This makes it possible to be able to adjust the driven shaft not only in or along its rotational axis, but also in a planar plane transversely to its rotational axis in order to compensate for assembly inaccuracies in relation to the swing leaf. The swing leaf drive can thereby be received displaceably in the receiving box such that it can follow a displacement of the adjusting frame or the swing leaf drive can also, if required, be subsequently adjusted after adjusting the adjusting frame.

A gear wheel is preferably provided and, according to a further configuration of the disclosure, encloses the driven shaft and is operatively connected to the driven shaft by means of a longitudinal toothing in a torque-transmitting manner such that the driven shaft is displaceable along its shaft axis or along its rotational axis, while the gear wheel remains in its vertical position. Therefore, a secure operative connection between driven shaft and actuator unit is ensured which increases the operational safety and makes the adjustability constructively simple.

In the case of each embodiment of the aforementioned actuators, the height-adjusting unit can have an adjusting element, in particular an adjusting screw, which is arranged in or on the adjusting frame such that, in the case of a swing leaf placed on the driven shaft, the adjusting screw is not hidden thereby and can be actuated by a person. This makes it possible to easily adjust the vertical position of the driven shaft and therefore of the assembled swing leaf.

The adjusting element, in particular the adjusting screw, can preferably be actuated from an upper side of the direct swing leaf actuator, from which the driven shaft also protrudes. The upper side is in this respect the side, which faces the swing leaf and which is arranged pointing upwards from the receiving box in the case of a design of the direct swing leaf actuator as a floor door actuator. This makes it possible to adjust the vertical position for example by means of a screwdriver.

Moreover, the height-adjusting unit can have a swing arm.

The swing arm is preferably rotatably received on a first end side in a pivot point on the adjusting frame and articulated on a second end side in an articulation point so as to be adjustable in the vertical direction by the adjusting element, in particular the adjusting screw. The swing-arm solution enables a simple construction whilst maintaining the necessary stability in order to introduce the force of the actuator unit into the swing leaf in an operationally safe manner. The driven shaft is thereby mounted on or in the swing arm of the height-adjusting unit, in particular in a region between the pivot point and the articulation point so as to absorb vertical forces and/or rotatably in a shaft axis of the driven shaft.

It can be provided that a bearing cup is received on the swing arm in which the driven shaft is mounted with a rear shaft end. This shaft end is opposite the shaft end on which the swing leaf can be placed. This creates a constructively simple arrangement and the driven shaft can remain vertical in spite of adjusting the inclination of the swing arm and can shift up and down in or on the adjusting frame depending on the adjustment.

Preferably on the bottom, i.e. on the side facing away from the swing leaf, is arranged a support sleeve in the adjusting frame, into which the bearing cup partially protrudes in order to maintain the vertical of the driven shaft. The adjusting frame thus forms the supports for the driven shaft which benefits the stability.

Preferably, at the top of the adjusting frame, a radial bearing is introduced in which the driven shaft is at least indirectly received. Therefore, the driven shaft is rotatably received on the adjusting frame. This also allows the forces to be passed from the adjusting frame to the receiving box; and the actuator unit, i.e. the drive or the spring force storage means itself, remains free of forces, which act on the driven shaft.

Alternatively or additionally, the adjusting frame is fastened, in particular screwed, on the receiving box by means of fastening elements, in particular screw elements. To this end, the adjusting frame has openings which are larger than a shaft of the fastening elements, in particular screw elements, in order to change a planar position of the adjusting frame in the plane of the bottom of the receiving box. Thus, only the adjusting frame is constructively adapted for adjusting; the receiving box can be designed conventionally and the actuator unit, i.e. the drive or the spring force storage means, does not have to be adjusted or at best tracked.

According to a further embodiment, the adjusting frame has eccentric elements. The eccentric elements form at least indirectly an operative connection between the adjusting frame and the receiving box in order to change a planar position of the adjusting frame in the plane of the bottom of the receiving box when the eccentric elements are actuated. Eccentric elements have the advantage that fastening elements, such as screws, do not have to be loosened beforehand for the adjustment; it is sufficient to simply rotate the respective eccentric element.

The adjusting frame preferably has a box shape with edge lengths, which deviate from one another by a maximum of 70%, preferably a maximum of 50% and particularly preferably a maximum of 30%. These are particularly well-suited measurements for example for use in floors.

Alternatively or additionally, the actuator unit, i.e. the drive or the spring force storage means, can be fastened in the receiving box by means of a receiving element. The arrangement of the receiving element in the receiving box is thereby designed to be movable such that the actuator unit can be fastened so as to be variably movable towards and away from the driven shaft along a longitudinal direction. This enables the actuator unit to also be adjusted in the receiving box, without having to design the actuator unit a particular way, precisely when the adjusting frame is displaced with the driven shaft in its planar plane. This increases the versatility in regards to the actuator units that can be used, for example in the form of a classic floor door actuator.

BRIEF DESCRIPTION OF THE DRAWINGS

Further measures that improve the disclosure will be outlined in greater detail below together with the description of a preferred exemplary embodiment of the disclosure on the basis of the figures. They show.

DETAILED DESCRIPTION OF THE DRAWINGS

Figure 1:
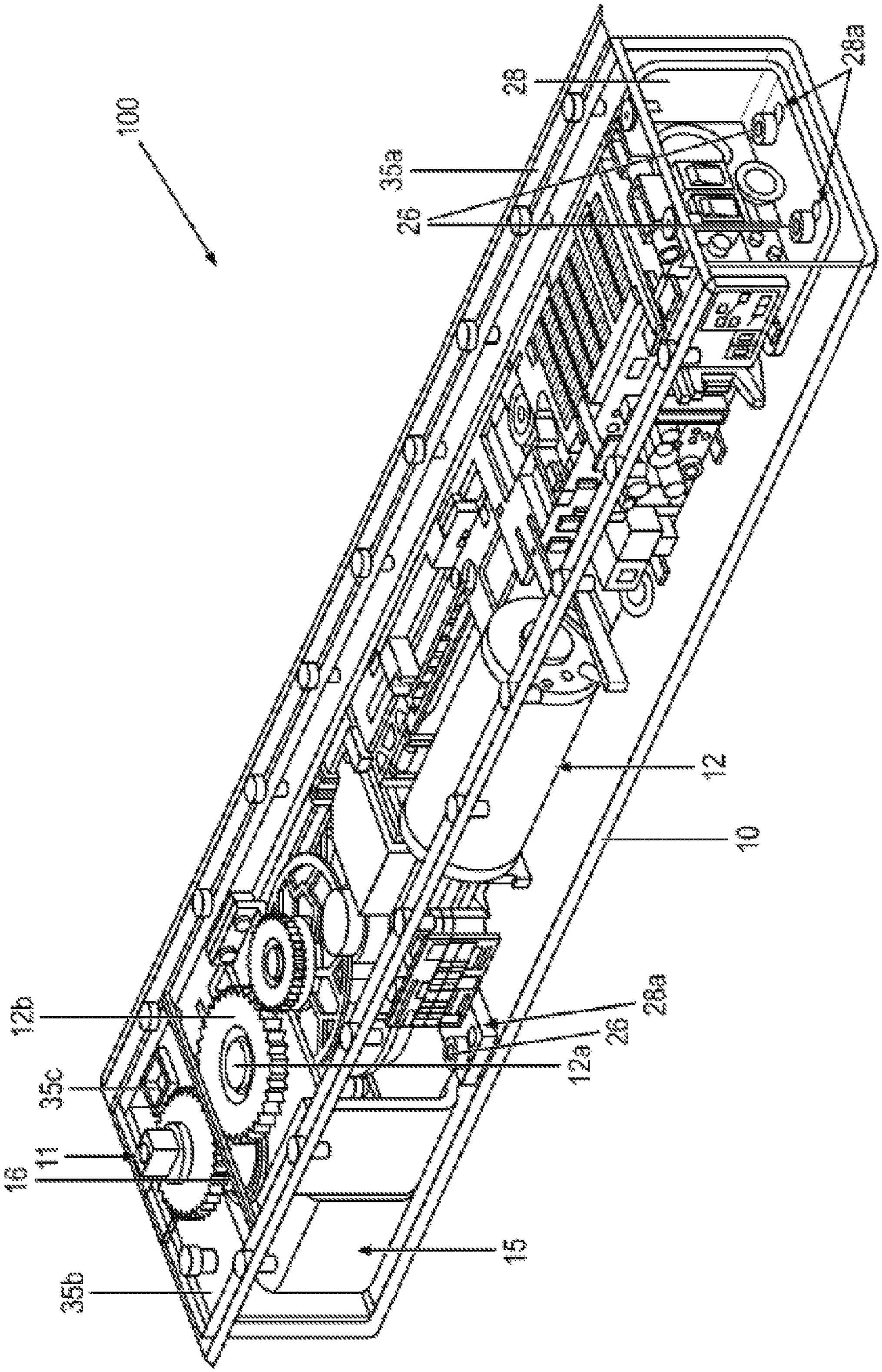
FIG. 1 a perspective and partially transparent view of a floor door actuator according to an exemplary embodiment of the disclosure, FIG. 2 a perspective partial view of the floor door actuator from FIG. 1, FIG. 3 a perspective view of the adjusting device of the floor door actuator from FIG. 1, FIG. 4 an exploded view of the adjusting device from FIG. 3, FIG. 5*a*-5*c* the adjusting device from FIG. 1 with the driven shaft in three vertical positions, and FIG. 6*a*-6*c* a partial plan view of the floor door actuator from FIG. 1 in three positions.

FIG. 1 shows a direct swing leaf actuator in the form of a floor door actuator 100 according to an exemplary embodiment of the disclosure in a perspective view.

The floor door actuator 100 comprises a transparently illustrated receiving box 10 in the form of a cement box designed in a substantially known manner. The receiving box 10 comprises in the interior a receiving element 28 which is designed as a holding profile only for the actuator unit 12. The receiving box 10 is sealed on its upper side facing the swing leaf by a cover preferably comprising two cover parts 35*a*, 35*b*. The receiving element 28 receives the actuator unit 12 in the form of a conventionally designed floor door closer in a stationary manner and so as to be individually replaceable. The receiving element 28 comprises elongated holes 28*a*, via which the actuator unit 12 is longitudinally displaceable with the receiving element 28 in the longitudinal direction of the receiving box 10 and can be fixed in the respective assembly position in the receiving box 10 via screw elements 26.

A height-adjusting unit 15 is connected to the left, rear end of the actuator unit 12 shown and is also received in the receiving box 10. A driven shaft 11 in the height-adjusting unit 15 protrudes from the cover 35*a*, 35*b* and is designed to be connected in a rotationally-operative manner to a swing leaf in its swivel axis. The configuration of the driven shaft 11 in this region preferably corresponds to the configuration of a driven shaft of a conventional floor door actuator or floor door drive and is therefore not described further.

The actuator unit 12 preferably also has a driven shaft 12*a*, which is also fully received in the receiving box 10. The driven shafts 11, 12*a* are connected to one another in a rotationally-operative manner. In the example shown, this operative connection is implemented by a gear wheel 12*b* being arranged in a torque-proof manner on the driven shaft 12*a*, said gear wheel 12*b* meshing with a gear wheel 16, which is arranged in a torque-proof manner on the driven shaft 11. Therefore, it is possible for the actuator unit 12 to swivel the indicated swing leaf via the height-adjusting unit 15. Additionally, the step-up or step-down gear ratio can be changed by different gear wheel pairs between the output shaft, the drive unit and the rotational axis of the door leaf. This enables, for example in the case of existing drive units with cam technology, an increase of the door opening angle and/or generally flexible, needs-based drive assembly, even as part of a retrofit.

The height-adjusting unit 15 and the actuator unit 12 are arranged independently of one another in the receiving box 10 and the connection between these two structural units is preferably limited to the operative connection between the two gear wheels 12*b* and 16. Of course, the height-adjusting unit 15 and the actuator unit 12 can, however, also be connected to one another in other ways.

In the cover part 35*b*, a through-opening 35*c* is designed, whose function will be explained further below.

Figure 2:
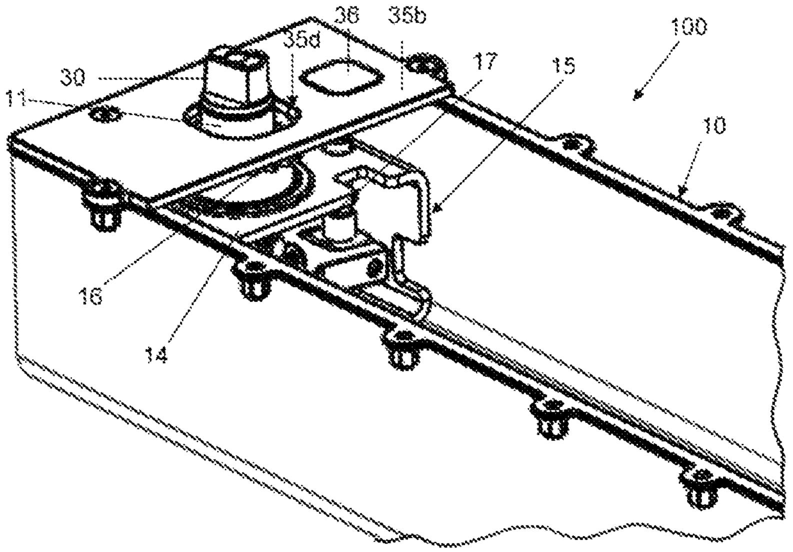

FIG. 2 shows the floor door actuator 100 without cover part 35*a* and actuator unit 12 in an enlarged cut-out. As can be discerned, the driven shaft 11 of the height-adjusting unit 15 passes through an associated through-opening 35*d* of the cover part 35*b*. On the upper end of the driven shaft 11 in FIG. 2, which is facing the swing leaf actuator, a driver 30 is designed, which has the form of conventional drivers of known direct swing leaf actuators in order to be connected in a rotationally-operative manner to an associated swing leaf.

The through-opening 35*c* not designated here is sealed by means of a covering 36, for example made of rubber, preferably in a moisture- and dust-proof manner. When the covering 36 is removed, an adjusting screw 17 of the height-adjusting unit 15, which will be explained further below, is accessible from above.

Figure 3:
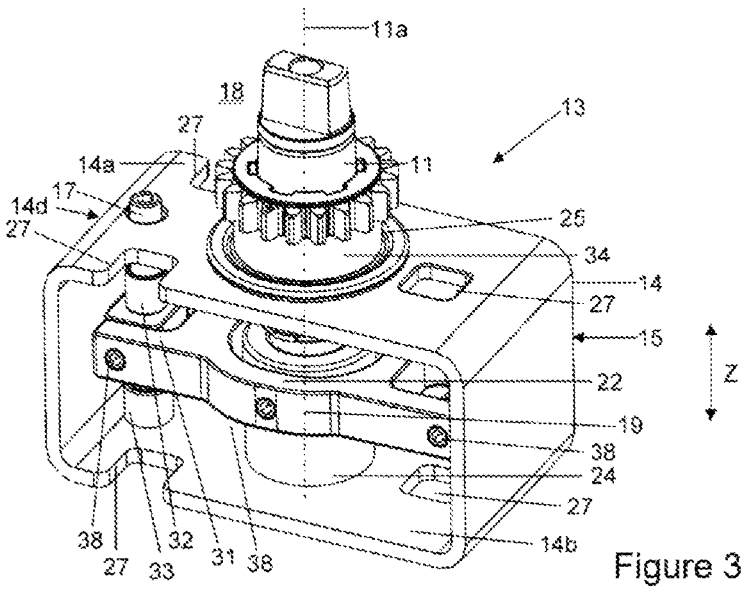

FIG. 3 shows a height-adjusting device 13, which comprises the height-adjusting unit 15, in a perspective view. The height-adjusting unit 15 comprises an adjusting frame 14, on which all other elements of the adjusting device 13 are received, such that a module is formed which forms a self-contained structural unit.

The vertical direction Z thereby designates the direction along a longitudinal extension or rotational or shaft axis 11*a* of the driven shaft 11 towards or away from the swing leaf not illustrated. The reference numeral 18 designates the upper side of the adjusting device 13 facing the swing leaf. The driven shaft 11 is freely rotatably received by means of a radial bearing 25 in a wall 14*a* of the adjusting frame 14 facing the swing leaf and in a support sleeve 24, which is designed on a wall 14*b* of the adjusting frame 14 facing away from the swing leaf and protrudes in a direction of the swing leaf from the wall 14*b*.

In the walls 14*a*, 14*b*, openings 27 are present, which align with one another in pairs in the Z direction and enable a lateral displacement of the adjusting device 13, explained further below, i.e. transversely to the Z direction.

The adjusting screw 17 is guided through a through-opening 14*c* of the wall 14*a* or can be operated through it using a tool and the adjusting screw 17 is supported on the lower wall 14*b* in a rotatably mounted manner. The adjusting screw 17 is provided at least in a region between the wall 14*a* and a receiving portion 33 with an external thread. The receiving portion 33 is attached to the lower wall 14*b* on the inside of the adjusting frame 14. The adjusting screw 17 is received stationarily in the receiving portion 33 in the Z direction and freely rotatably along its longitudinal extension such that its rotational axis extends in the Z direction.

The adjusting screw 17 has on its end facing the through-opening 35*c* (see FIG. 1) an engagement section, not designated, for example in the form of a hexagon socket. Therefore, it is possible to rotate the adjusting screw 17 through the through-opening 35*c* using a tool when the covering 36 is removed.

The external thread of the adjusting screw 17 is screwed into a corresponding internal thread of a screw-in element 31 and/or a sleeve 32 attached thereto or formed thereon. Owing to the stationary reception in the receiving portion 33, it is possible to displace the adjusting arrangement of screw-in element 31 and sleeve 32 in the vertical direction Z by rotating the adjusting screw 17. This changes the distance of the adjusting arrangement 31, 32 from the wall 14*a* or 14*b*.

Figure 4:
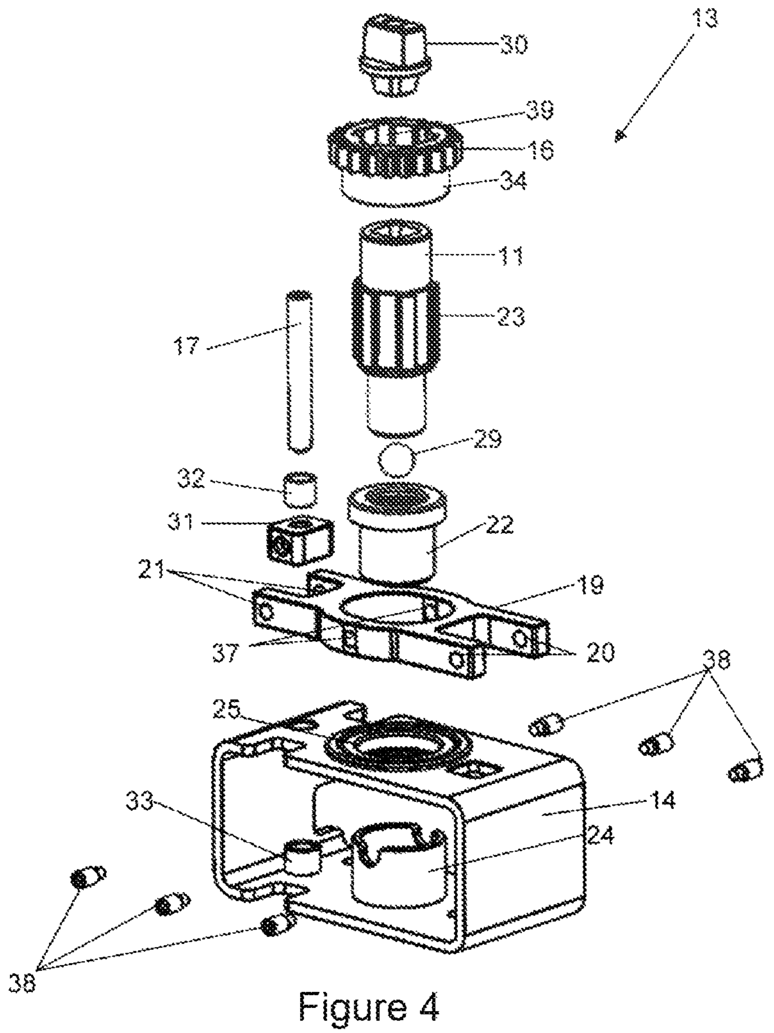

When further considering FIG. 4, it is discernible that the screw-in element 31 is attached via a pin 38 so as to be rotatable about a rotational axis to a left end of a swing arm 19. At its opposing end, the swing arm 19 is in turn also attached for example via a pin 38 rotatably to the adjusting frame 14. A bearing cup 22 is received between the two thus formed pivot points 20, 21 on the swing arm 19 via a pin 38. Therefore, a movement of the screw-in element 31 in the Z direction causes an identical movement of the bearing cup 22 over roughly half the way.

As shown in detail in FIG. 4, the bearing cup 22 has a receiving portion open in the direction of the swing leaf into which a bearing ball 29 is freely rotatably inserted. Above the ball 29 is the driven shaft 11, which has on its side facing the ball 29 an open receiving portion, in which the ball 29 partially rests such that the driven shaft 11 is rotatably received in the bearing cup 22 via the bearing ball 29. The bearing cup 22 is received at its end facing away from the driven shaft 11 in the support sleeve 24 guided vertically in the Z direction.

The driven shaft 11 has roughly centrally a longitudinal toothing 23 extending in the Z direction, which is engaged with a corresponding inner toothing 39 of the gear wheel 16 in a torque-transmitting manner and displaceably in the Z direction.

The driver 30 can be designed in one piece with the driven shaft 11 or, as shown here, positively engage into a corresponding upper receiving portion of the driven shaft 11. The driver 30 has on its upper end facing away from the driven shaft 11 an engagement section designed in a known manner for the swing leaf to be placed thereon.

The gear wheel 16 has on its end facing the adjusting frame 14 a bearing section 34, which is inserted into the radial bearing 25, via which the gear wheel 16 is freely rotatably mounted in the adjusting frame 14.

Figure 5A:
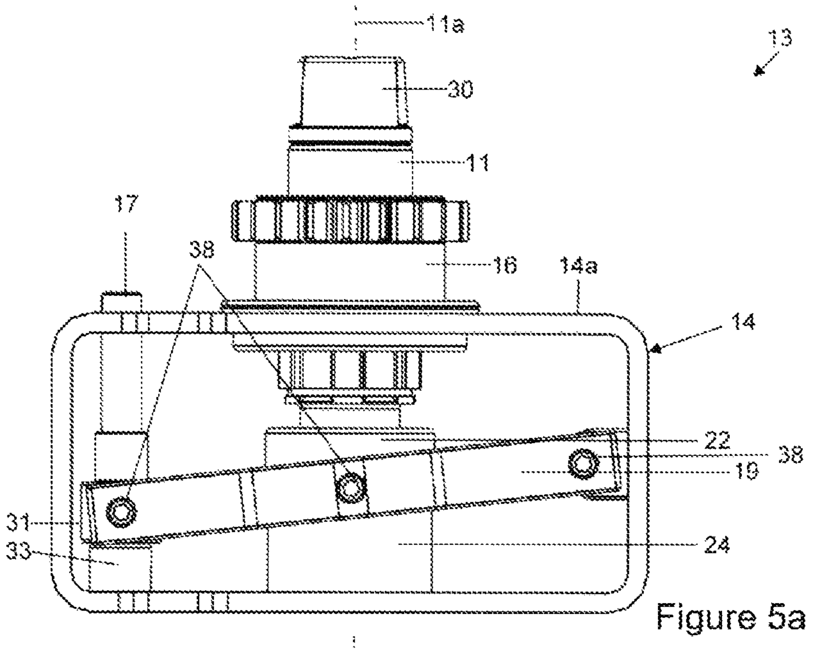

FIG. 5 shows the adjusting device 13 in three vertical positions. FIG. 5*a* shows the operating position, in which the driver 30 is moved furthest downwards in the adjusting frame 14, the middle pins 38 or the bearing cup 22 supported by them thus rest on the support sleeve 24. Alternatively or additionally, the screw-in element 31 rests on the receiving portion 33.

If the adjusting screw 17 is turned for example clockwise, owing to the engagement of the external thread of the adjusting screw 17 with the sleeve 32 or with the screw-in element 31, the latter is moved in the Z direction towards the upper wall 14*a*. Owing to the stationary mounting of the swing arm 19 on the right end, the middle pins 38 and the bearing cup 22 supported by them are therefore also moved in the same direction as the screw-in element 32. Owing to the bearing ball 29, the driven shaft 11 and the driver 30 are therefore also moved in this direction.

Figure 5B:
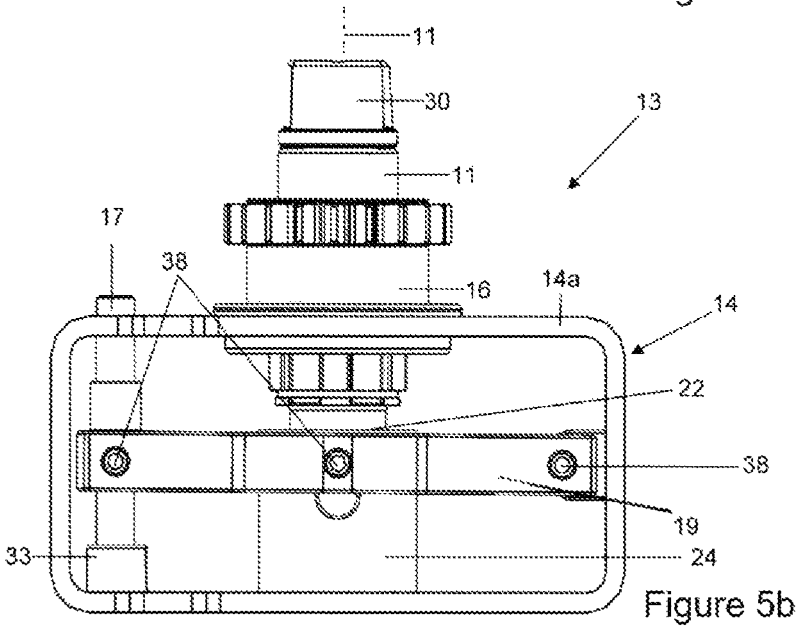
Figure 5C:
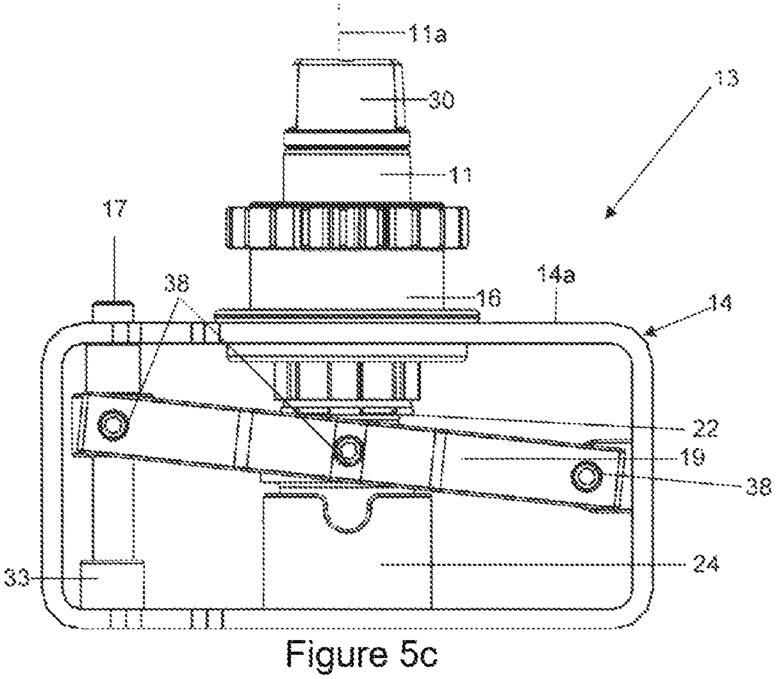

FIG. 5*b* shows roughly the central extended operating position of the driver 30, whereas FIG. 5*c* shows the maximum extended operating position of the driver 30 (preferably 10 mm compared to FIG. 5*a*). In this operating position, the sleeve 31 preferably abuts on the inner side of the wall 14*a*. The wall 14*a* thus forms the upper stop for the sleeve 31.

Figure 6A:
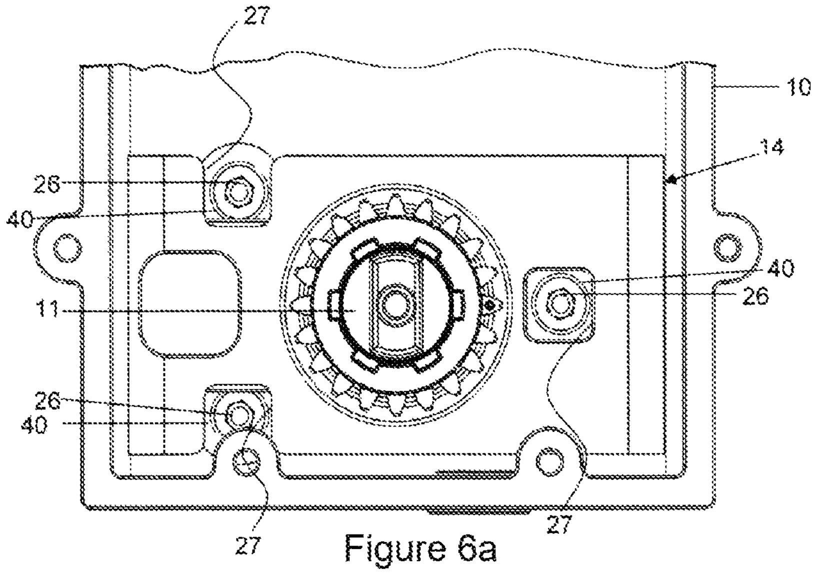
Figure 6B:
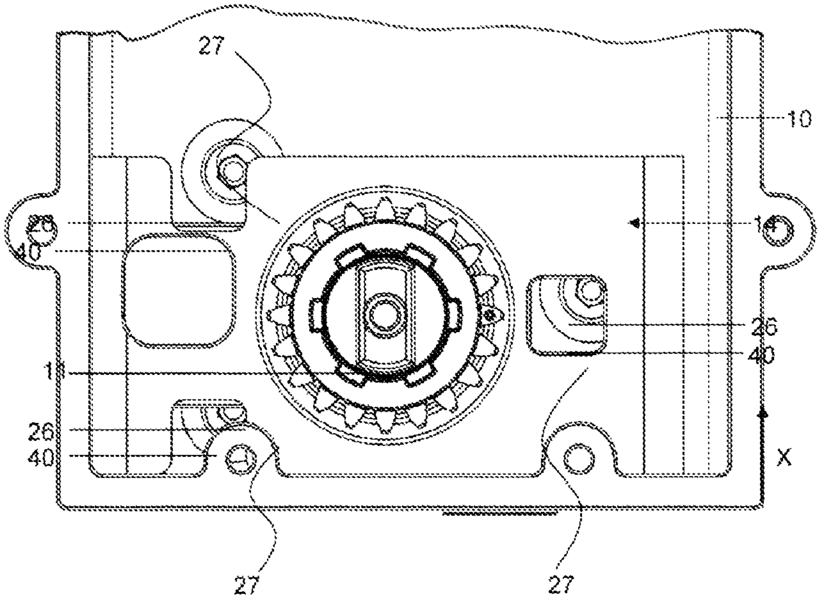

FIG. 6 shows a partial plan view of the floor door actuator 100 in three positions. The openings 27 shown in FIG. 3 and designed in the wall 14*a* serve to guide through a tool for example in the form of a screwdriver from the cover side in the direction of the adjusting frame 14. The openings 27 designed in the wall 14*b* serve to guide through a respective screw element 26. Each screw element 26 is screwed with the receiving box 10 in the Z direction away from the wall 14*a* through an associated disc 40 and an associated opening 27 through the wall 14*b*. Therefore, the three screw elements 26 here fix the adjusting frame 14 to or in the receiving box.

Advantageously, the openings 27 are, in at least one of the two horizontal directions, i.e. in the X direction (=longitudinal direction) and/or Y direction (=transverse direction—see FIG. 6*c*), greater than the outer diameter of the screw element 26 respectively guided through. The discs 40 are thereby designed to be so large in these directions that they rest securely on the inner side of the wall 14*b* facing them in each screwed-in position of the associated screw element 26 in the mentioned horizontal directions.

This makes it possible to displace the adjusting frame in the X direction and/or Y direction and therefore to also align the driven shaft 11 in the plane transverse to the Z direction and namely preferably in the range of 10 mm.

Figure 6C:
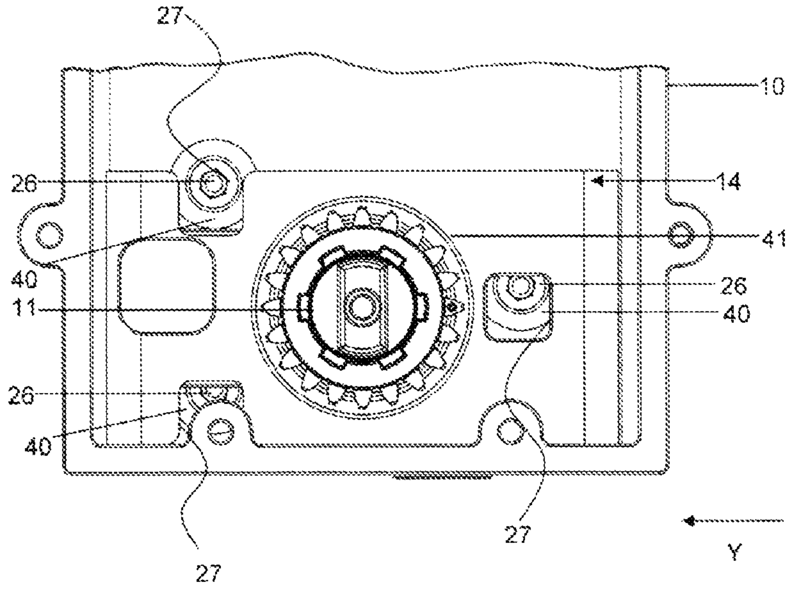

In FIG. 6*c*, an eccentric disc 41 is discernible which allows the adjusting frame 14 to be easily displaced when the screw elements 26 are loosened.

As a result, three-dimensional adjustability of the driven shaft 11 in relation to the receiving box 10 is created in the maximum case.

The design of the disclosure is not restricted to the preferred exemplary embodiment indicated above. In fact, a number of variants is conceivable which make use of the illustrated solution even with fundamentally different designs. All features and/or advantages emerging from the claims, the description or the drawings, including constructive details or spatial arrangements, may be essential to the disclosure even in the most varied combinations. The floor door actuator 100 can be designed as a floor door drive, which can thus move the connected swing leaf in both swivel directions (open and closed). Alternatively or additionally, the swing leaf can be formed by means of a window or door leaf. Alternatively or additionally, instead of being accommodated in the floor, accommodation in the ceiling is in turn also provided. In this case, a mount must be provided between the driven shaft 11 and the bearing cup 22 which prevents movement of the driven shaft 11 in the Z direction in relation to the bearing cup 22. Instead of being accommodated in the ceiling, assembly on a frame, which freely rotatably receives the swing leaf, can also be provided. The function of the receiving box 10 would then be assumed by a housing attached to the frame, which receives the swing leaf actuator 12 and the adjusting device 13. Instead of the gear wheels 12*a*, 16, any other type of gear, such as for example a chain drive, can be used.

In summary, the floor door actuator 100 according to the disclosure enables small dimensions with very good adjustability even with an assembled swing leaf and good ability to replace the drive. Door closers or -drives already present can be integrated. Double-leaf door systems with small door leaf widths are possible. The thus formed swing leaf actuator is very low-maintenance. An in particular mechanical closing sequence control can be readily implemented.

The invention claimed is:

1. A direct swing leaf actuator for actuating a swing leaf of a leaf system, the direct swing leaf actuator comprising: a receiving box for receiving an actuator unit and for arrangement in or on a stationary part of the leaf system or of a building comprising the leaf system, and further comprising a driven shaft configured to be moved into operative connection with an actuator unit, wherein a swing leaf is configured to be placed on the driven shaft in a torque-transmitting manner, and wherein a device is present for adjusting a spatial position of the driven shaft relative to the receiving box, wherein the device has an adjusting frame with a height-adjusting unit, wherein the adjusting frame is arranged in the receiving box and wherein the driven shaft is received on the adjusting frame to be height-adjustable using the height-adjusting unit, and wherein the height-adjusting unit has a swing arm, rotatably received on the adjusting frame on a first end side in a pivot point and articulated on a second end side in an articulation point to be adjustable by an adjusting element in a vertical direction.

2. The direct swing leaf actuator according to claim 1, wherein the device is designed with the adjusting frame and the height-adjusting unit such that the actuator unit is configured to be arranged substantially or completely outside of the adjusting frame and structurally separated or separable therefrom in the receiving box.

3. The direct swing leaf actuator according to claim 1, wherein a gear wheel or a chain wheel is arranged on the driven shaft and configured to be moved to interact with the actuator unit.

4. The direct swing leaf actuator according to claim 3, wherein the gear wheel arranged on the driven shaft encloses the driven shaft and is operatively connected to the driven shaft by a longitudinal toothing in a torque-transmitting manner such that the driven shaft is displaceable along a shaft axis of the shaft, while the gear wheel remains in a vertical position.

5. The direct swing leaf actuator according to claim 1, wherein the height-adjusting unit has the adjusting element, which is arranged in or on the adjusting frame, such that, in the case of a swing leaf placed on the driven shaft, the adjusting element is not hidden thereby and is configured to be actuated by a person.

6. The direct swing leaf actuator according to claim 1, wherein the adjusting element is configured to be actuated from an upper side of the direct swing leaf actuator, from which the driven shaft also protrudes.

7. The direct swing leaf actuator according to claim 1, wherein the driven shaft is mounted on the swing arm of the height-adjusting unit in a region between the pivot point and the articulation point to absorb vertical forces.

8. The direct swing leaf actuator according to claim 1, wherein a bearing cup is received on the swing arm, in which the driven shaft is mounted with a rear shaft end, wherein the rear shaft end is opposite a shaft end on which the swing leaf can be placed.

9. The direct swing leaf actuator according to claim 8, wherein at a bottom of the adjusting frame is arranged a support sleeve, into which the bearing cup partially protrudes in order to form a lower bearing point of the driven shaft.

10. The direct swing leaf actuator according to claim 1, wherein at a top of the adjusting frame, a radial bearing is introduced in which the driven shaft is at least indirectly received.

11. The direct swing leaf actuator according to claim 1, wherein the adjusting frame is fastened on the receiving box with fastening elements, for which purpose the adjusting frame has openings which are larger than a shaft of the fastening elements, in order to change a planar position of the adjusting frame in the plane of a bottom of the receiving box.

12. The direct swing leaf actuator according to claim 1, wherein the adjusting frame has eccentric elements, which form at least indirectly an operative connection between the adjusting frame and the receiving box in order to change a planar position of the adjusting frame in the plane of a bottom of the receiving box when the eccentric elements are actuated.

13. The direct swing leaf actuator according to claim 1, wherein the adjusting frame has a box shape with edge lengths, wherein at least one edge length of the box shape is a maximum of 70% of another edge length of the box shape.

14. The direct swing leaf actuator according to claim 1, wherein a receiving element is provided, with which the actuator unit can be fastened in the receiving box and with which the arrangement of the receiving element in the receiving box is configured to be designed so as to be movable in such manner that the actuator unit is configured to be fastened so as to be variably movable towards and away from the driven shaft along a longitudinal direction.

* * * * *